Nov. 30, 1926.

E. H. SEVERSON

AEROPLANE

Filed Dec. 1, 1925

INVENTOR.
E. H. Severson.
BY
ATTORNEY

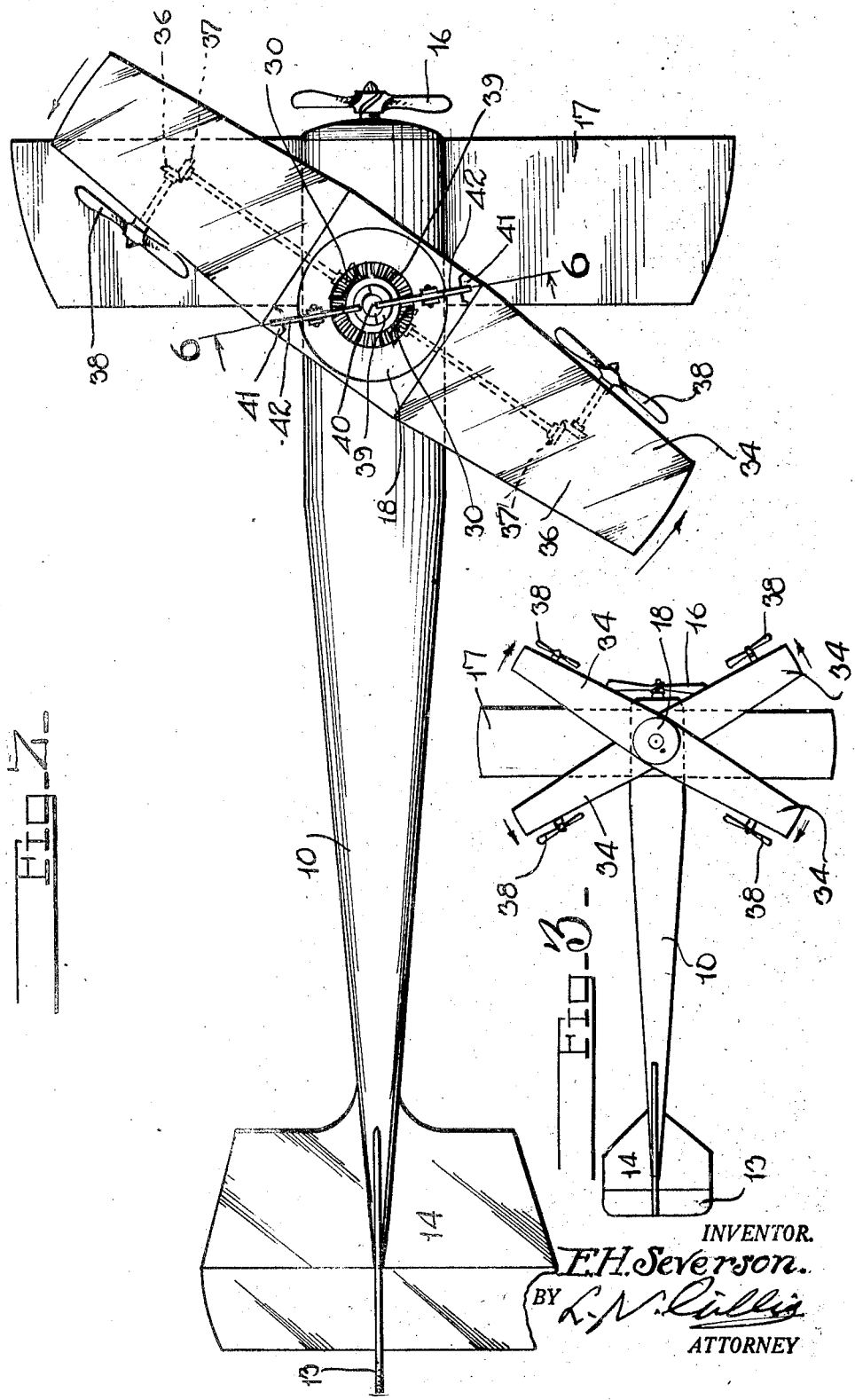

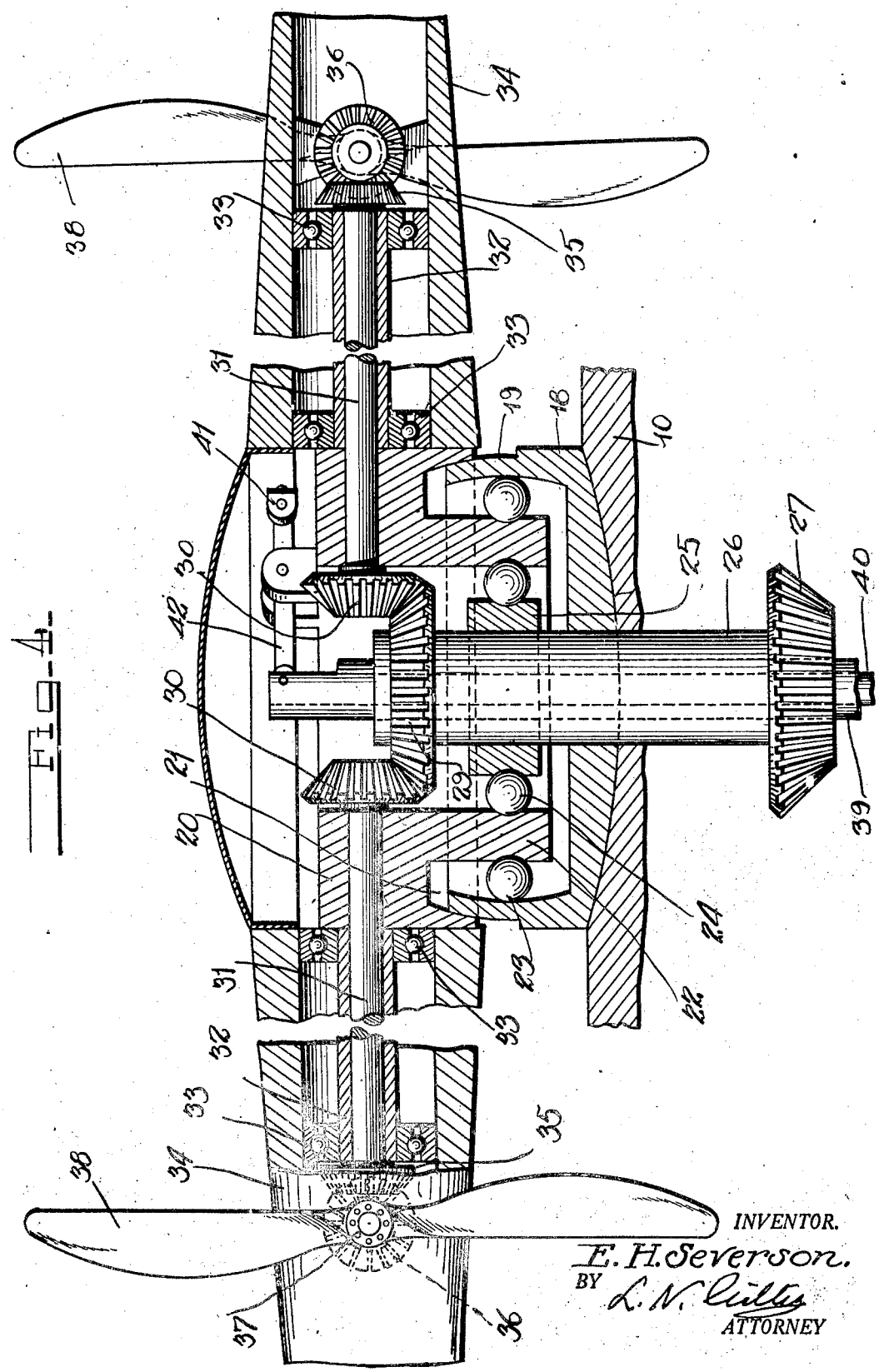

Nov. 30, 1926.
E. H. SEVERSON
1,609,002
AEROPLANE
Filed Dec. 1, 1925
4 Sheets-Sheet 4
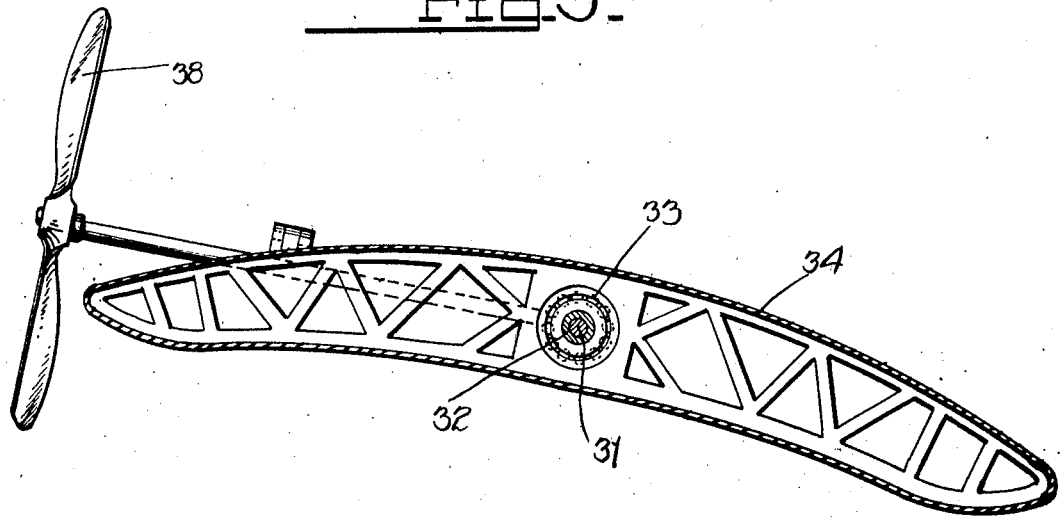
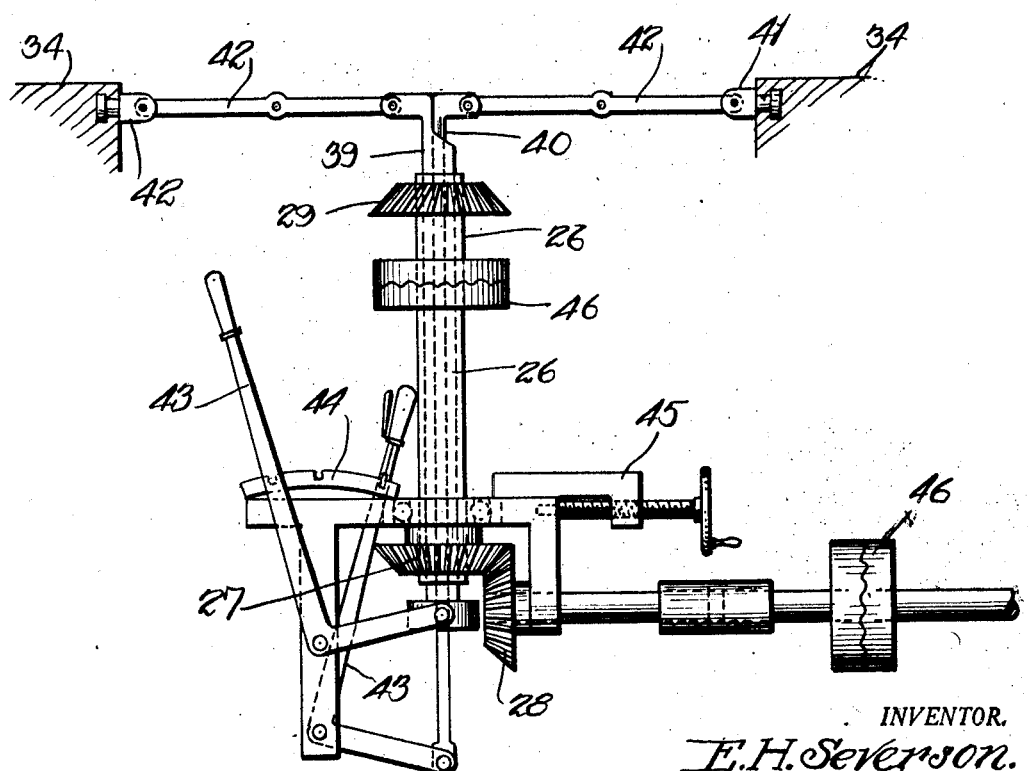
INVENTOR.
E. H. Severson.
BY L. N. Gillig
ATTORNEY Patented Nov. 30, 1926.

1,609,002

UNITED STATES PATENT OFFICE.

ERNEST H. SEVERSON, OF AUBURN, WASHINGTON.

AEROPLANE.

Application filed December 1, 1925. Serial No. 72,564.

This invention relates to aeroplanes and has special reference to a combination of helicopter and aeroplanes. Preferably the invention is termed a helicopter-aeroplane.

One important object of the invention is to provide an ordinary aeroplane with a helicopter device which will enable the aeroplane to rise in a vertical direction to any desired altitude and be there held as long as desired.

A second important object of the invention is to enable a device of this character to be converted, at will, into an aeroplane wherein the propulsive factor obtaining horizontal flight, or substantially horizontal flight will be the equivalent of an ordinary aeroplane.

A third important object of the invention is to provide a machine of this character wherein the aeroplane may be caused to hover over any one spot after such horizontal flight or to descend or ascend over such spot at will.

It is a well known fact, that biplanes are steadier in the air than monoplanes. It is therefore a fourth important object of the invention to provide an aeroplane of the biplane description wherein at least one set of planes will act as a helicopter to elevate the machine vertically or to permit the vertical depression of such machine.

A fifth important object of the invention is to provide means whereby the helicopter wings or aerofoils may be locked into cooperative relation with the ordinary elevating wings so that both act in the same manner.

A sixth important object of the invention is to provide means whereby said planes may be tilted at any desired position.

A seventh object of the invention is to provide improved means whereby the helicopter wings may be varied in inclination to the normal.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 2 is a plan view thereof.

Figure 3 is a modified plan view thereof.

Figure 4 is a detailed section through the driving mechanism for the helicopter wings.

Figure 5 is a section through one of the helicopter wings.

Figure 6 is a section on the line 6—6 of Figure 2.

Figure 1:
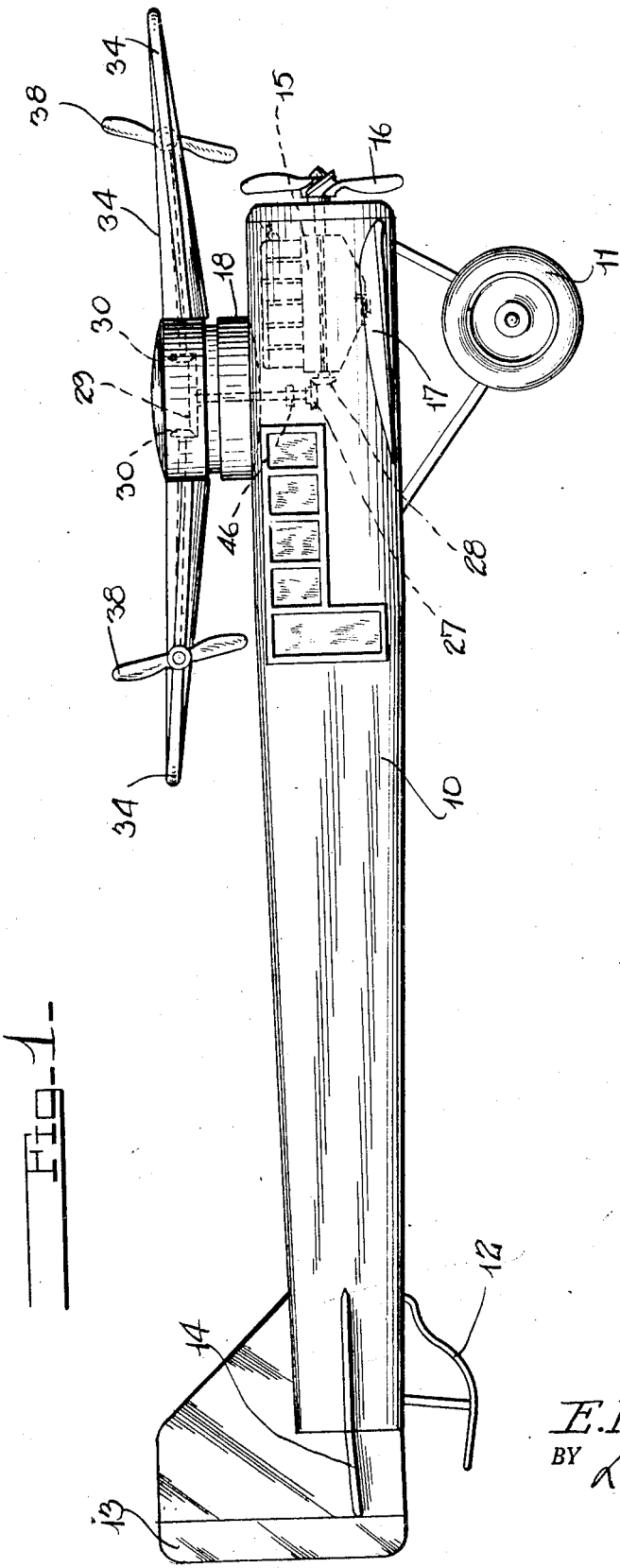
Figure 1 is a side elevation of a machine constructed in accordance with this invention.

This invention, in the present arrangement, has the usual fuselage 10 provided with the forward landing wheels 11 and tail skid 12. It is of course also equipped with the horizontal direction rudder 13 and vertical direction rudders 14. In the forward end of the fuselage is the usual aeroplane engine 15 which drives an ordinary propeller 16. Also located at the forward end of the fuselage are the stationary wings 17. On top of the fuselage and preferably behind the wings 17 is a turret 18. The upper portion of the turret 18 is formed as the zone of a sphere as indicated at 19, the inner wall being similarly formed. Mounted on this turret is a hub 20 which has a recess 21 conforming to the zone 19. This hub also has an extension 22 and between this extension and the inner wall of the zone are placed the balls 23 forming an anti-friction device. Other balls 24 on the inside of the hub supporting collar 25 which in turn carries a sleeve shaft 26 having at its lower end a bevel gear 27 meshing with a bevel gear 28 on the engine shaft. At the upper end of this sleeve shaft is a bevel gear 29 which meshes with a pair of bevel gears 30. Fixed on shafts 31 journalled in the hub 20 and extending through sleeves 32 supported by anti-friction bearings 33 are wings or aerofoils 34. The outer ends of these shafts 31 carry bevel gears 35 which mesh with bevel gears 36 carried on short shafts 37 projecting through the forward or leading edges of the wings 34 and having on their projecting ends the wing propellers 38. Due to this arrangement the wings 34 may be angularly adjusted with respect to the shafts 31 and in order to obtain this angular adjustment there is provided centrally of the hollow shaft 26 an inner hollow shaft 39 and a central shaft 40. At the forward edge of each wing is provided a swivel 41 and a lever 42 pivoted on the hub 20, connects the respective swivel with one of the inner shafts. Connected to the lower end of each shaft 39 and 40 is a bell crank shaft 43 operating over a quadrant 44. These several devices are controlled by a screw and bracket 45 and clutches 46.

In the form shown in Figure 3 a pair of the wings 34 are used, one revolving in one direction and one in the other.

In operation we will assume that the aeroplane is resting on the ground. Suppose it is desired to make a flight. The engine is started and thereupon connection is made through the clutches to the gears 30. This causes the propellers 38 to revolve and pull the wings 34 around thus acting as a helicopter. The aeroplane is thereby lifted off the ground. When the desired height has been reached the clutches are so shifted as to disengage the mechanism for revolving the propellers 38 and to engage the mechanism for revolving the propeller 16. At the same time the wings 34 are brought parallel to the wings 17 and there stopped by the brake mechanism. Thus, at first the device forms a helicopter and when it has risen acts as an ordinary aeroplane. Of course in descent the reverse takes place. The propeller 16 is cut off and the helicopter wings 34 are started in motion.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:—

1. In an aeroplane, a fuselage, a turret support on the fuselage, a hollow hub carried by the turret and rotatable with respect thereto, shafts extending radially from the hub and into the hollow portion thereof, wings mounted on the outer portions of said shafts and rotatable thereon, stub shafts journalled in said wings adjacent the outer extremities of the first shafts and projecting from the leading edges of said wings, propellers carried on the projecting portions of the stub shafts, bevel gearing connecting the first shafts with the stub shafts, bevel gears on the inner ends of the first shafts, means to drive the last mentioned gears, and means for independently varying the angles of incidence of respective wings.

2. In an aeroplane, a fuselage, a turret support on the fuselage, a hollow hub carried by the turret and rotatable with respect thereto, shafts extending radially from the hub and into the hollow portion thereof, wings mounted on the outer portions of said shafts and rotatable thereon, stub shafts journalled in said wings adjacent the outer extremities of the first shafts and projecting from the leading edges of said wings, propellers carried on the projecting portions of the stub shafts, bevel gearing connecting the first shafts with the stub shafts, bevel gears on the inner ends of the first shafts, a hollow driving shaft having its upper end disposed between the last mentioned gears, a bevel gear on the upper end of the driving shaft meshing with the last mentioned gears, a hollow plunger slidable in the hollow shaft, a second plunger slidable in the hollow plunger, a pair of levers fulcrumed between their ends on the hub and each having one end connected to a respective plunger and its other end connected to the inner end of a respective wing in spaced relation to the first mentioned shaft supporting said wing and means to independently actuate said plunger.

In testimony whereof I affix my signature.

ERNEST H. SEVERSON.